(12) United States Patent
Le Garjan et al.

(10) Patent No.: US 9,924,219 B2
(45) Date of Patent: Mar. 20, 2018

(54) DEVICE AND METHOD FOR STORING A PLURALITY OF OVERLAPPING RECORDINGS OF A SAME DIGITAL VIDEO AND/OR AUDIO STREAM

(71) Applicant: THOMSON LICENSING, Issy de Moulineaux (FR)

(72) Inventors: Bruno Le Garjan, Rennes (FR); Franck Adam, Rennes (FR); Mark A. McCleary, Indianapolis, IN (US)

(73) Assignee: Thomson Licensing (FR)

( * ) Notice: Subject to any disclaimer, the term of this patent is extended or adjusted under 35 U.S.C. 154(b) by 15 days.

(21) Appl. No.: 14/651,219

(22) PCT Filed: Dec. 3, 2013

(86) PCT No.: PCT/EP2013/075419
§ 371 (c)(1),
(2) Date: Jun. 10, 2015

(87) PCT Pub. No.: WO2014/090639
PCT Pub. Date: Jun. 19, 2014

(65) Prior Publication Data
US 2015/0312621 A1    Oct. 29, 2015

(30) Foreign Application Priority Data

Dec. 12, 2012 (EP) .................................... 12306571

(51) Int. Cl.
| | | |
|---|---|---|
| *H04N 21/4335* | (2011.01) | |
| *G11B 27/10* | (2006.01) | |
| *G11B 27/30* | (2006.01) | |
| *H04N 5/76* | (2006.01) | |
| *H04N 21/4147* | (2011.01) | |
| *H04N 21/845* | (2011.01) | |
| *H04N 21/433* | (2011.01) | |
| *H04N 21/61* | (2011.01) | |

(52) U.S. Cl.
CPC ....... *H04N 21/4335* (2013.01); *G11B 27/105* (2013.01); *G11B 27/3027* (2013.01);
(Continued)

(58) Field of Classification Search
CPC .. H04N 21/4335; H04N 5/76; H04N 21/4147; H04N 21/4334; H04N 21/6125; G11B 27/105; G11B 27/3027
(Continued)

(56) References Cited

U.S. PATENT DOCUMENTS

2006/0008242 A1  1/2006 Dolph
2006/0024026 A1  2/2006 Yamashita et al.
(Continued)

FOREIGN PATENT DOCUMENTS

MX  2010013502  2/2011
WO  WO2010111239  9/2010

OTHER PUBLICATIONS

"Network DVR", from Wikipedia, the free encyclopedia, pp. 1-3; Oct. 18, 2011.
(Continued)

*Primary Examiner* — Mishawn Hunter
(74) *Attorney, Agent, or Firm* — Jack Schwartz & Associates, PLLC (57) ABSTRACT

In storing of a plurality of overlapping recordings of a same digital video and/or audio stream, resource optimization is obtained through reuse of allocated resources when multiple record actions are operated on a same digital video and/or audio stream.

14 Claims, 6 Drawing Sheets

(52) U.S. Cl.
CPC .......... *H04N 5/76* (2013.01); *H04N 21/4147* (2013.01); *H04N 21/4334* (2013.01); *H04N 21/6125* (2013.01); *H04N 21/8456* (2013.01)

(58) Field of Classification Search
USPC .......................... 386/278, 291, 295; 725/134
See application file for complete search history.

(56) References Cited

U.S. PATENT DOCUMENTS

| | | |
|---|---|---|
| 2007/0081789 A1 | 4/2007 | Winick et al. |
| 2007/0157281 A1* | 7/2007 | Ellis .................. H04N 7/17309 725/134 |
| 2007/0263980 A1 | 11/2007 | Chen et al. |
| 2008/0013920 A1 | 1/2008 | Plourde, Jr. et al. |
| 2008/0183843 A1* | 7/2008 | Gavin .................... G06Q 30/06 709/217 |
| 2009/0222875 A1* | 9/2009 | Cheng .................... H04H 20/63 725/147 |
| 2010/0325682 A1 | 12/2010 | Pothana |
| 2011/0252452 A1 | 10/2011 | Guo et al. |
| 2011/0311204 A1 | 12/2011 | Adimatyam et al. |
| 2013/0294749 A1* | 11/2013 | Burns ..................... H04N 9/87 386/278 |

OTHER PUBLICATIONS

Hunter: "Cloud PVR spreads over Europe Broadcast Engineering", pp. 1-3, Originally features on BroadcastEngineering.com; Jul. 9, 2012.
Search Report dated March 11, 2014.

* cited by examiner

DEVICE AND METHOD FOR STORING A PLURALITY OF OVERLAPPING RECORDINGS OF A SAME DIGITAL VIDEO AND/OR AUDIO STREAM

This application claims the benefit, under 35 U.S.C. § 365 of International Application PCT/ EP2013/075419, filed Dec. 3, 2013, which was published in accordance with PCT Article 21(2) on Jun. 19, 2014under number WO2014/090639 in the English language and which claims the benefit of European patent application No. 12306571.6, filed Dec. 12, 2012.

1. FIELD OF INVENTION

The present invention relates to storing of digital video and/or audio streams.

2.TECHNICAL BACKGROUND

Various devices have been developed to enable consumers to record video and/or audio programs for later presentation. To this end, PVR (Personal Video Recorder) functions are offered by digital devices via for example a USB (Universal Serial Interface) port that allows connecting external devices for storage such as memory sticks and hard disc drives. One of the features that make PVRs popular with users is the possibility to operate a so-called time-shift of a live broadcasted television program, i.e. the user can pause and resume the program. This functionality comes in addition to a more classical recording function. The drawback is that the PVR features require more or less scarce resources such as a tuner, demultiplexer (demux) and memory. For receivers with a front end such as for satellite or terrestrial reception, it is necessary to add a second tuner to the device if a PVR possibility is offered on a receiver, to allow a user to simultaneously visualize a broadcast program and record another one. Also, for receivers with or without front end (an example of receiver without front end is an IPTV receiver) the demultiplexer must be capable of demultiplexing multiple digital video and/or audio streams at a same time. As to the memory, considerable memory space is required in the case of video recording, and in particular in the case of recording of a broadcast program transmitted in HD (High Definition) format. The memory requirements are even more important when a user operates multiple PVR functions at a same time. For example, when a user activates a timeshift on a live broadcast program, a memory zone is required for a timeshift buffer. When at a same time the user is recording the program, a second memory zone is required for storing the program. As another example, if in a household equipped with multiple Set Top Boxes (e.g. living room, bedrooms) multiple users of these STBs record or timeshift a broadcast programs starting the recording at different times, memory zones are required for each record and timeshift. Separate resources are thus allocated for each function; there is no factorization of resources.

There is thus a need for further optimization of prior art solutions.

3. SUMMARY OF THE INVENTION

The present invention aims at alleviating some inconveniences of prior art.

To this end, the invention comprises a method of storing a plurality of overlapping recordings of a same digital video and/or audio stream. The method stores the plurality of overlapping recordings of the same digital video and/or audio stream as a single segmented recording. Each segment of the single segmented recording comprises a non-overlapping part of the digital video and/or audio stream. The method comprises receiving of a first request for recording of the digital video and/or audio stream. The receipt of the first request results in opening of a segment, referred to as current segment, and in recording of the digital video and/or audio stream in the current segment. The method also comprises receiving of a second request for recording the digital video and/or audio stream. The receipt of the second request results in closing of the current segment and opening of a new current segment and continuing recording of the digital video and/or audio stream in the current segment. Finally, the method comprises receiving of a third request for stopping the recording of the digital video and/or audio stream. The receipt of the third request results in closing of the current segment. If there is still at least one recording ongoing, a new current segment is opened and recording of the digital video and/or audio stream in the current segment is continued.

According to a variant embodiment of the invention, a segment is a file, and the closing is a file close operation.

According to a variant embodiment of the invention, a segment is a memory segment, and the closing is a placement of an index.

According to a variant embodiment of the invention, the method comprises, per segment, a storing of a time stamp related to the digital video and/or audio stream.

According to a variant embodiment of the invention, the method comprises, per segment, a storing of information relating a segment to a user at the origin of a request.

According to a variant embodiment of the invention, the request for recording is a request for time shifting a visualization of the digital video and/or audio stream, and the request for stopping of the recording is a request for resuming the visualization.

The invention also concerns a device for storing of a plurality of overlapping recordings of a same digital video and/or audio stream. The device comprises storage for storing of the plurality of overlapping recordings of the same digital video and/or audio stream as a single segmented recording. Each segment of the single segmented recording comprises a non-overlapping part of the digital video and/or audio stream. The device further comprises an interface for receiving a first request for recording of the digital video and/or audio stream, a central processing unit for opening a segment, referred to as current segment, and a memory for recording of the digital video and/or audio stream in the current segment. The device further comprises a network interface for receiving a second request for recording the digital video and/or the audio stream, a central processing unit for closing of the current segment and for opening of a new current segment and a memory for continuing recording of the digital video and/or audio stream in the current segment. Finally, the device comprises a network interface for receiving a third request for stopping the recording of the digital video and/or audio stream, a central processing unit for closing of the current segment, and for opening of a new current segment and a memory for continuing recording of the digital video and/or audio stream in the current segment if there is at least one recording ongoing.

4. LIST OF FIGURES

More advantages of the invention will appear through the description of particular, non-restricting embodiments of the invention. The embodiments will be described with reference to the following figures.

To facilitate understanding, identical reference numerals are used where possible to designate identical elements that are common to the figures.

5. DETAILED DESCRIPTION OF THE INVENTION

Figure 1:
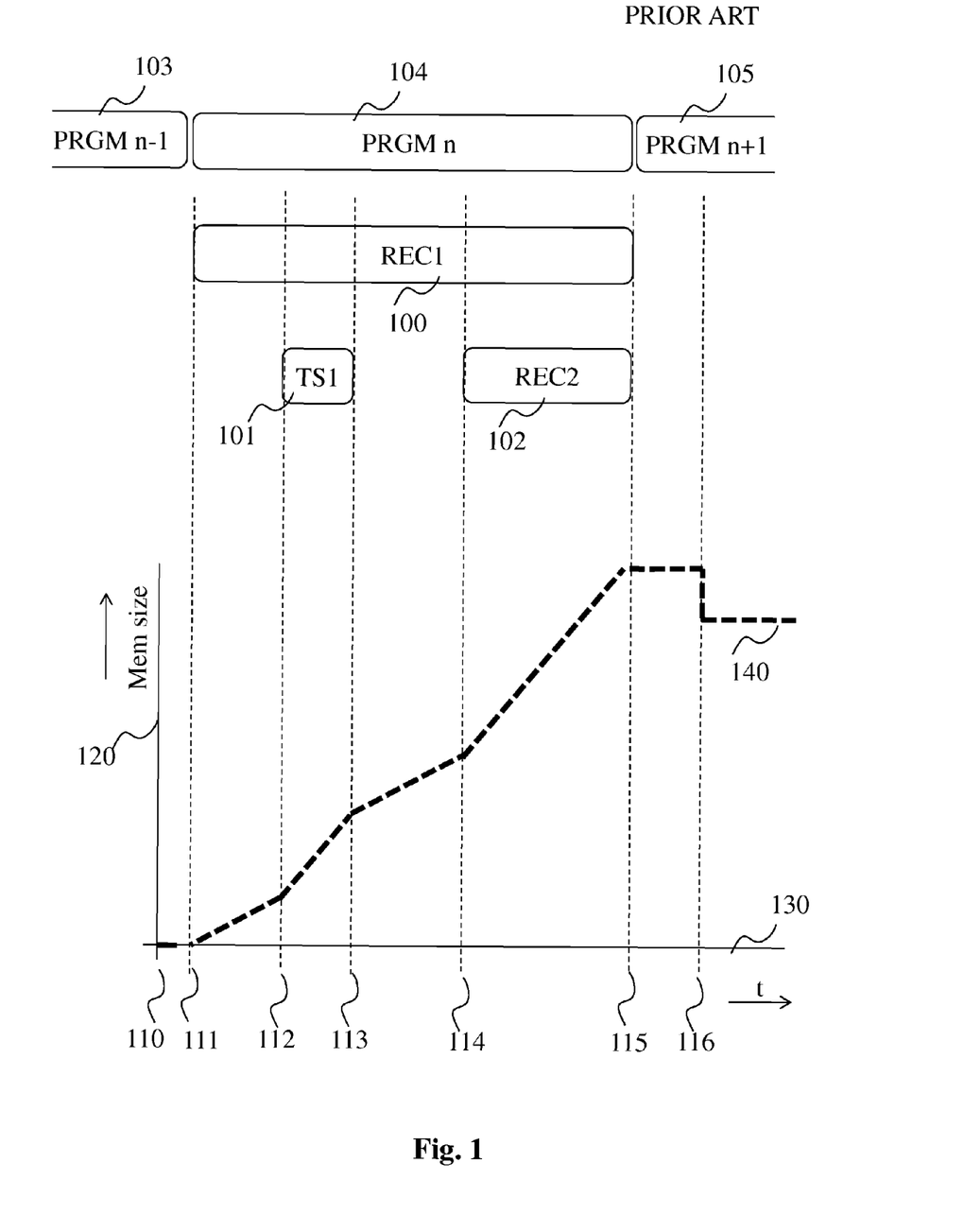
FIG. 1 illustrates a prior art method for storing of digital video and/or audio streams in memory.

FIG. 1 illustrates a prior art method for storing a plurality of overlapping recordings of a same digital video and/or audio stream in memory or disc, in file form or not. The diagram comprises three parts. Items 103-105 represent in a first part a live broadcasted digital video and/or audio stream comprising three consecutive digital video and/or audio programs: digital video and/or audio program "n−1" 103, digital video and/or audio program "n" 104, and digital video and/or audio program "N+1" 105. In the second part, items 100-102 represent memory buffers or files (hereinafter the notation "memory buffer/file" is used, the symbol "/" meaning "or"), a first memory buffer/file 100, a second memory buffer/file 101, and a third memory buffer/file 102. The third part of the diagram represents a graph where total required storage space (120), i.e. the total of memory buffers/files 100-102, is plotted against time (130). Events 110-116 are marked on the timeline. Graph 140 represents the evolution of total required storage space over time.

The diagram corresponds to a scenario where:
- a first user records digital video and/or audio program "n" 104 at T=111, for example by pressing a button "rec" on the PVR function buttons of his remote control;
- the first user, while visualizing the digital video and/or audio program "n" as it is recorded at the same time, starts a time shift at T=112 of the same digital video and/or audio program "n", for example by pressing on the "pause" button;
- the first user releases the pause and thus resumes the visualization at T=113, for example by pressing on the "play" button;
- a second user starts a second recording at T=114, by pressing the "rec" button on a remote control of a second device while visualizing the same digital video and/or audio program "n".

At T=115, the transmission of digital video and/or audio program "n" ends. The visualizing of the digital video and/or audio program ends also at this moment for the second user that directly watched the broadcast.

At T=116, the visualizing of digital video and/or audio program "n" ends for the first user (remember: the visualizing was delayed due to the timeshift at T=111).

In this scenario, it is assumed for reasons of simplicity that the video and/or audio stream that comprises digital video and/or audio program "n" has a constant bit rate of 5 Mbit/s.

Thus, at T=111, when the first user presses the "rec" button on his remote control in order to record digital video and/or audio program "n" 104, a first memory buffer or file 100 is created. Graph 140 illustrates the required storage space for storing of data from the digital video and/or audio stream that is related to digital video and/or audio program "n" 104 as it is received. The graph shows a steady increase of required storage space between T=111 and T=112, with a constant storage space fill rate that corresponds to the bit rate of the digital video and/or audio stream that comprises the digital video and/or audio program "n" (i.e. 5 Mbit/s according to the example). At T=112, a first user presses on the "pause" button; i.e., this starts a time shift function. Note that time shift function implementation comprises multiple variants, such as "automatic" and "manual" mode, that differ in the moment when a recording starts. In automatic time shift mode, the recording starts upon a connection to the video and/or audio program. In manual time shift mode, used for example if the time shift buffer is in flash memory, the recording starts upon the key press. As the time shift starts, a second memory buffer/file 101 is created for the time shift function. As data is written to the second memory buffer/file and the first memory buffer/file at the same time, graph 140 shows that the total storage space fill rate has doubled between T=112 and T=113, corresponding to the double recording of digital video and/or audio program "n" i.e. 10 Mbit/s. At T=113, the first user presses the "play" button on his remote control. Now, the storage space fill rate drops again to 5 Mbit/s. this is due to the functioning of the time shift memory buffer/file. Though digital video and/or audio data continues to be written to the time shift memory buffer/file, digital video and/or audio data is also read at the same time from the time shift memory buffer/file, resulting in a situation where the time shift memory buffer/file no longer increases in size. This results in the total required storage space increasing twice as slow between T=113 and T=114 (i.e. 5 Mbit/s as mentioned previously). Then, at T=114, a second user watching the same digital video and/or audio program "n" 104, presses the "rec" key on his remote control. A third memory buffer/file 102 is created at that moment, and total storage space fill rate doubles again between T=114 and T=115, i.e. to 10 Mbit/s. At T=115, the end of digital video and/or audio program "n" is reached and as the first and the second recordings stop, memory buffers/files 100 and 102 are no longer filled with digital video and/or audio data. At T=116, the time shift ends, e.g. the user presses the "stop" button when he arrives at the end of the time shifted transmission of program "n", and the time shift memory buffer/file is released (i.e. memory is 'freed', or the file is deleted), resulting in a drop of total storage space required after T=116.

This prior art method is not optimal in terms of storage space usage. The content from the same digital video and/or audio stream is stored multiple times without regard related to overlapping parts: TS1 (101) and REC2 (102) are overlapping with REC1 (100). Though the resources that are needed are described only in terms of memory/file storage space, other resources may be needed such as front end and/or demultiplexer. Depending on the hardware used, the prior art method may require the use of multiple front ends and/or demultiplexers to allow the multiple simultaneous recordings as depicted in the scenario of FIG. 1, and it might be necessary to equip the device with components that are designed to sustain the maximum storage space fill rate (throughput rate) that is reached due to multiple simultaneous recordings, such as hard disk and memory that are designed to support the throughput rate.

In the previous section, total storage space requirement is described. Individual memory/file storage that comprises the total storage space may be physically located in different devices, such as in a first STB for the first user, and a second STB for the second user. The storage space may also be physically located in a single device, such as in a master and slave STB configuration where the master and the slave are interconnected in a home network. In such a configuration the master STB has the memory/file storage space for offering record and time shift functions and the slave STB is a low-cost device that has no resources for recording/time shifting but that uses the functions of the master STB through (e.g. http) streaming over the home network, the master streaming video and/or audio content over the home network to the slave STB(s).

Figure 2:
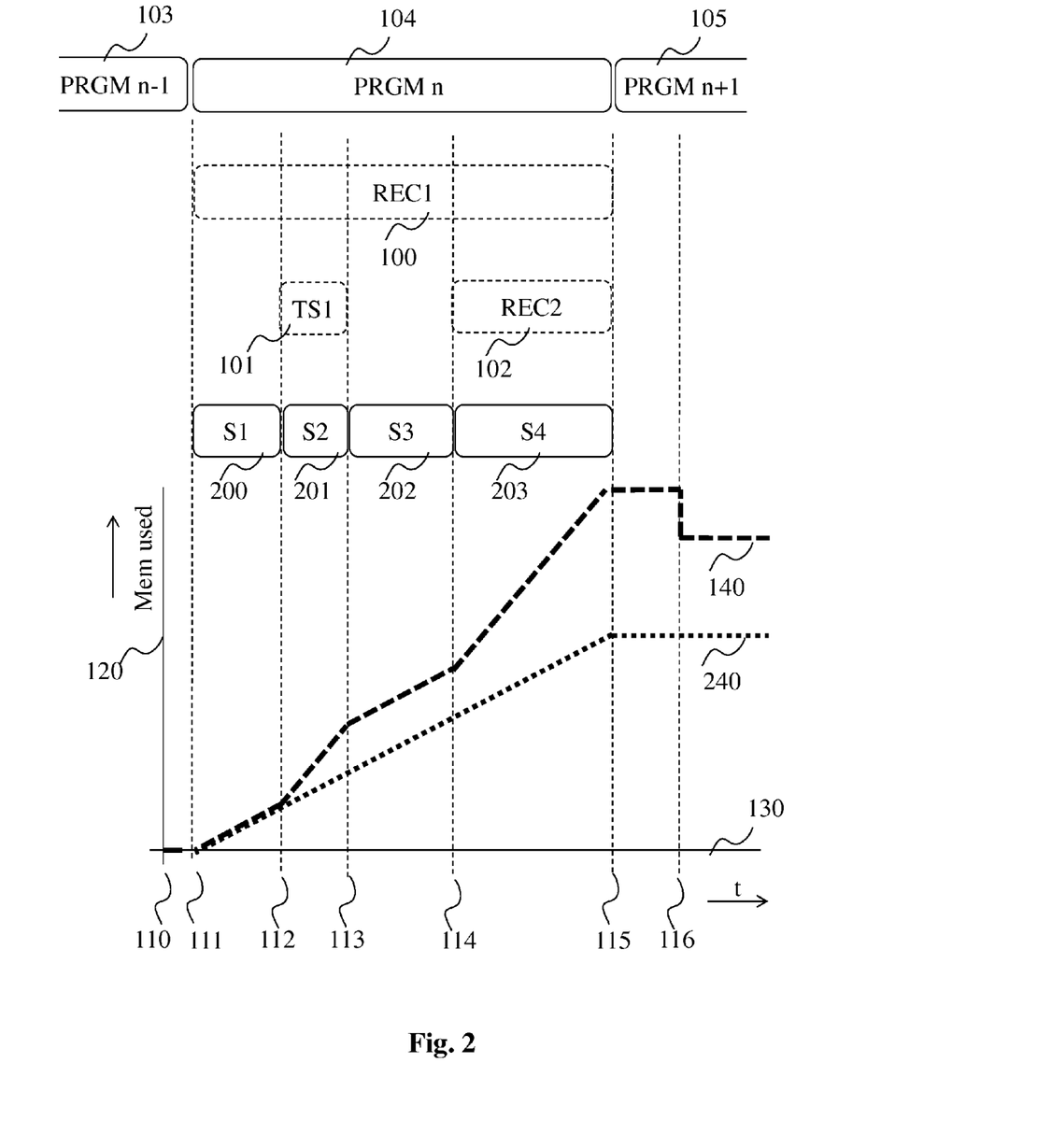
FIG. 2 illustrates the method for storing of digital video and/or audio streams in memory according to a particular, non-limiting embodiment of the invention.

FIG. 2 illustrates the method for storing of digital video and/or audio streams according to a particular, non-limiting embodiment of the invention. The elements that are in common with FIG. 1 have already been described for that figure and their description is therefore not repeated here. Compared to FIG. 1, FIG. 2 comprises additional elements such as graph 240 and "segments" S1 (200), S2 (201), S3 (202), and S4 (203). These segments are memory segments in a storage space such as memory 516 of device 500, or files stored in a file system, stored in the discussed memory 516, or on an external device. The graph 140 of FIG. 1 is also plotted in this figure for reasons of comparison. The same usage scenario is unrolled as for FIG. 1. However, it can be observed that according to graph 240 the storage space fill level and rate evolve differently and more advantageously than with the prior art method. Contrary to the prior art method of FIG. 1, the digital video and/or audio data from the digital video and/or audio stream are no longer stored in memory buffers/files 100-102, but are rather stored in segments 200-203 that represent non-overlapping parts of the digital video and/or audio stream. Graph 240 depicts the total required storage size for storing all segments over time.

The method of storing a plurality of overlapping recordings of a same digital video and/or audio stream is explained hereafter with the help of this non-limiting example.

As the first user starts recording digital video and/or audio program "n" 104 at T=111, a new segment "S1" (200) is created or 'opened'. To facilitate understanding, a segment that is open for writing of data from the digital video and/or audio stream is hereafter referred to as the "current" segment; i.e. data from the stream of digital video and/or audio is always written (recorded) to one segment, that is, to the "current" segment. The user starting a recording is an example of a trigger event that is a request for recording of the digital video and/or audio stream. As data from digital video and/or audio program "n" is written (recorded) to the current segment S1, the storage space fill rate is constant between T=111 and T=112, i.e. according to our example, 5 Mbit/s. At T=112, the user presses the "pause" key (which is an example of a trigger event related to a time shift function). This results in segment "S1" being split, i.e. a new segment "S2" (201) is created (opened), that can be referred to as the new "current" segment. The previous "current" segment is closed. Digital video and/or audio data from digital video and/or audio program "n" is now written (recorded) to S2. Because no more data is written (recorded) to S1, the total storage space fill rate remains constant at 5 Mbit/s. When the user presses the "play" key at T=113 (which is another example of a trigger event related to a time shift function, or in others words a request to resume the visualization) a new segment "S3" (202) is created that becomes the new "current" segment, and the previous segment is closed. During storing, digital video and/or audio data from the digital video and/or audio program "n" is written (recorded) to current segment S3 and the total storage space fill rate remains at 5 Mbit/s. At T=114, the second user presses the "rec" key on his remote control (=trigger event related to a request for recording), in order to record the ongoing broadcast of the same digital video and/or audio program "n". This results in splitting of the current segment S3 and thus in creation of a new current segment "S4" (203) and the closing of the previous current segment. Digital video and/or audio data from digital video and/or audio program "n" is now written (recorded) to current segment S4 until at T=115 the transmission of the digital video and/or audio program "n" comes to an end. The end of transmission of program "n" is an example of a request generated from a signalization event that is representative for program changes in the digital video and/or audio stream, when the digital video and/or audio stream is a succession of video and/or audio programs. The reception of this trigger event results in the closing of segment S4. Between T=114 and T=115, the total storage space fill rate remains constant at 5 Mbit/s. After T=115, the storage space is no longer filled with data from the digital video and/or audio stream and the fill level remains constant. At T=116, the time shift ends, e.g. the user presses the "stop" button when he arrives at the end of the time shifted transmission of program "n".

Thus, all of the functions described above, i.e. 2 records and one time shift, can be provided with the current invention. The first recording and the second recording can be played from segment S1 to S4 for the first recording, and segments S3 and S4 for the second recording. The timeshift can be provided from segments S2 to S4. It can be seen from a comparison of graphs 140 and 240 that with the prior art method the storage space fill rate fluctuates, whereas the storage space fill rate with the method according to the invention is constant. For the dimensioning of hardware components of a device that implements the invention, such as a gateway or Set Top Box device offering PVR (Personal Video Recorder) functionality based on the present invention, this is important as the discussed throughput rate is not dependent on the number of simultaneous recordings that the device can support. It can also be observed that total storage space fill level is significantly lower than according to the prior art solution of FIG. 1. This is also important as it remains constant that memory in all of its different forms (built-in RAM, memory card/stick, hard disk drive) is a relatively scarce resource, and that current tendency is to increase the video and audio quality of recordings, whereby the recording of high-quality video is known to require a high amount of storage space.

The above non-limiting example is deliberately kept simple to facilitate understanding. In the previous example, it is assumed that the digital video and/or audio stream is of the CBR (Constant Bit Rate) type, but the current invention is not limited to CBR type streams, and can also be applied to VBR (Variable Bit Rate) type streams. Also, in practice, time shift buffer management may be more complex than mentioned, for example if additional features are supported such as full trick mode support, including fast rewind. Such enhanced implementation may require the permanent use of a time shift buffer, which for example allows to fast rewind to content that was received before the user hits the "pause"

button. Then, the splitting in segments may be more or less complex than depicted in the example, but this does not change the principles of the invention.

Figure 3:
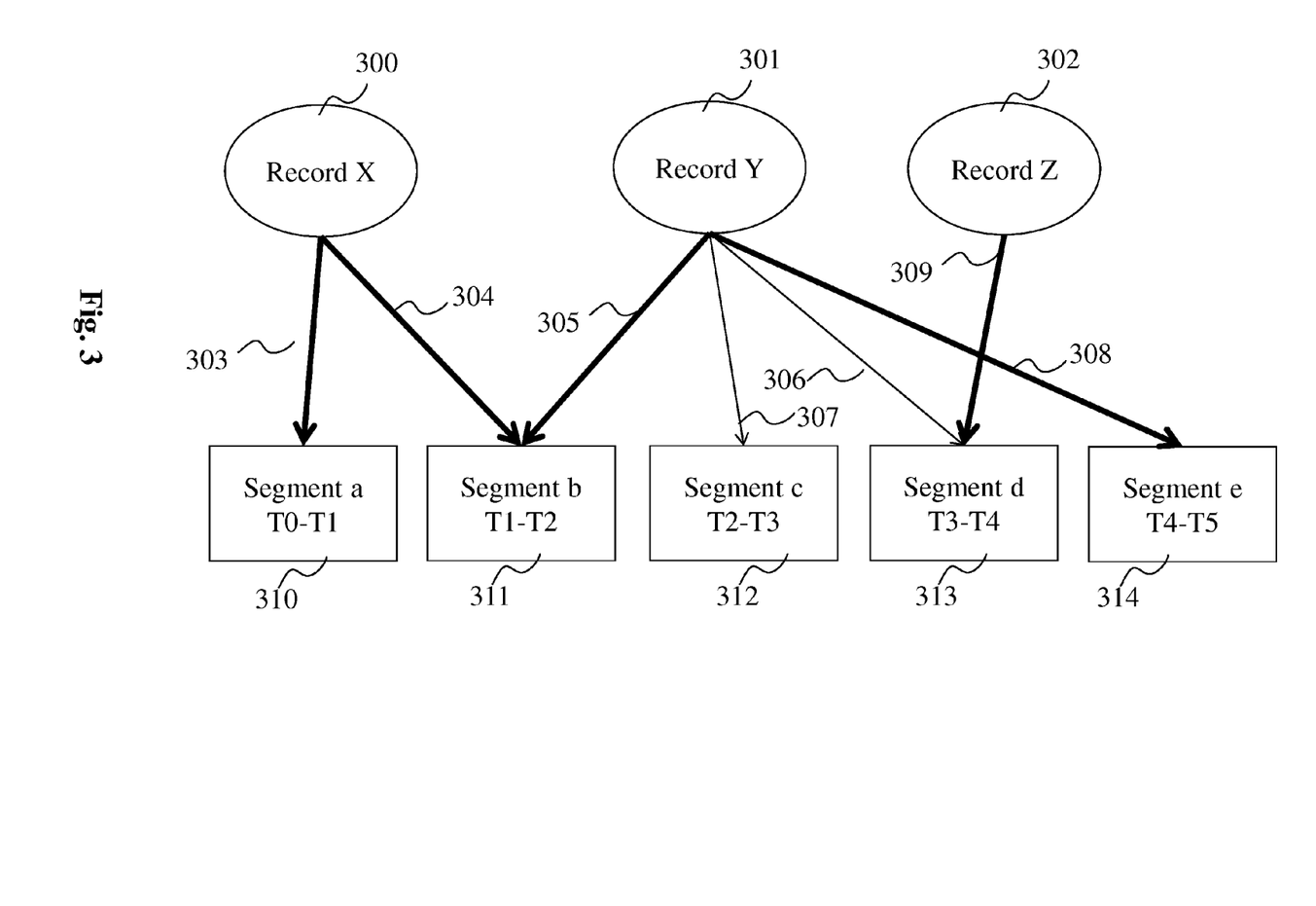
FIG. 3 illustrates a non-limiting example usage scenario of the storing method of the invention.

FIG. 3 illustrates a further non-limiting example usage scenario of the storing method of the invention. Here, a "record" is a list of segments that corresponds to a start-date/end-date of a recording of a same digital video and/or audio stream "A". A record corresponds for example to a specific digital video and/or audio program or a timeshift buffer. In this example, there are three records, "X", "Y" and "Z" (respectively illustrated by 300, 301 and 302).

According to the following scenario:

A user "x" starts a recording of digital video and/or audio stream "A" at T0, and stops recording at T2. The starting recording action of "x" at T0 is illustrated by arrow 303 and results in creation of "current" segment "a" 310. Data of the digital video and/or audio stream "A" is written to segment "a" 310. The stopping recording action of "x" at T2 is illustrated by arrow 304. Between T0 and T2, a user "y" starts a recording of the same digital video and/or audio stream "A" at T1 (illustrated by arrow 305). This results at T1 in splitting of the segment that was created at T0, i.e. in a segment "a" 310 and a new "current" segment "b" 311. Segment "a" 310 is now thus split in two segments, "a" 310 and "b" 311. Data from digital video and/or audio stream "A" now continues to be written to the current segment, i.e. segment "b" 311. At T2, user "x" stops recording (illustrated by arrow 304). This results in creation of a new current segment "c" 312. Data from digital video and/or audio stream "A" is now written to segment "c" 312. At T3, user "z" starts a recording action (arrow 309). This results in T3 in the creation of a new segment "d" 313. Data from digital video and/or audio stream "A" is now written to segment "d" 313. At T4, user "z" stops recording (arrow 309). This results in T4 in the creation of a new current segment "e" 314. At T5, user "y" stops recording (arrow 308). Arrows 306 and 307 indicate that segments "c" and "d" "belong" to Record Y 301 (in addition to segments "b" and "e").

Three recordings now exist: i) record "X" 300, comprising segments "a" 310 and "b" 311; ii) record "Y" 301, comprising segments "b" 311, "c" 312, "d" 313, and "e" 314; iii) record "Z" 302, comprising segment "d" 313. During this recording sequence, only one front end and only one demultiplexer, tuner and/or descrambler has been used. Storage space required for storage is optimized since at any moment, digital video and/or audio stream "A" is only once written to storage space.

According to a particular implementation of the current invention, in for example in a device or an application, users are kept unaware of the division of a record into segments, and are not aware of sharing of segments between users. A management method then is responsible for keeping or deleting segments. Between users, protection can be added so that when user "x" wants to play back its record "X", this user will have access to segments "a" 310 and "b" 311, but not to any other segments that were recorded before the start date and after the start date of the recording (c, d, e; respectively 312, 313, 314) by other users. In practice the protection of stored digital video and/or audio data between users can be implemented by giving processes that access the segments only access to segments based on an identification, such as a user ID. Additional security can be added by encryption of the segments to be sure that only a particular hardware can read the segments, such as a Set Top Box from which a recording was operated. To ease the management of the segments, segment lists can be created. For example, according to the scenario of FIG. 3, a first user "x" has a first segment list comprising segments a (310) and b (311), corresponding to a storing of A from timeslot T0 to T2. A second user "y" has a segment list comprising segments b (311) to e (314), corresponding to a storing of A from timeslot T1 to T5. A third user "z" has a segment list comprising segment e (314), corresponding to a storing of A from timeslot T4 to T5.

According to a variant embodiment of the method of the invention, the method comprises the storage of time stamps related to the digital video and/or audio stream, per segment. For example, each time a trigger event is received that results in a segment being split (i.e. a new segment being created), timestamp information related to the digital video and/or audio stream is stored for the new segment. This feature is advantageous for the management of the storage segments in storage space.

The following table 1 is based on the discussed scenario of FIG. 2 and represents an example of a list (stored in the form of a table), where further information related to the record(s) to which a segment belongs is stored:

TABLE 1 storing of timestamp information in a list ("segment list")

| Segment | Timestamp | Record |
|---------|-----------|--------|
| a | T0-T1 | {X} |
| b | T1-T2 | {X, Y} |
| c | T2-T3 | {Y} |
| d | T3-T4 | {Y, Z} |
| e | T4-T5 | {Z} |

Figure 5:
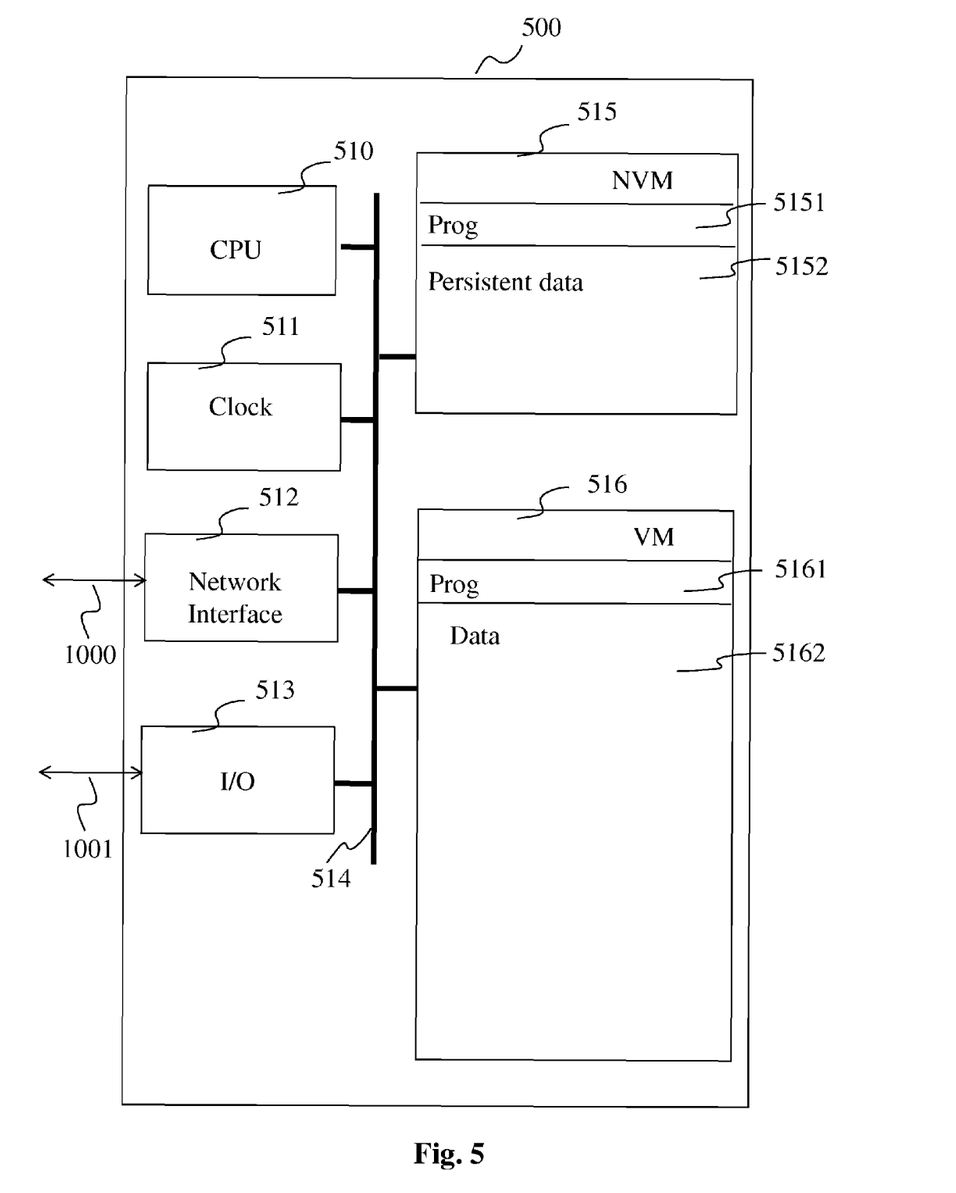
FIG. 5 is a block diagram of a device implementing the invention according to a particular non-limiting embodiment.

The timestamps can be retrieved from a clock unit such as clock unit 511 in device 500, or be obtained from an external clock, or be obtained from timestamps present in the recorded video and/or audio stream, such as NPT (Network Time Protocol) time stamps present in an RTP stream, or PCR/PTS (Program Clock Reference/Presentation Time Stamp) in an MPEG 2 transport stream. Alternatively and instead of using timestamps, pointers or indexes may be stored in a list that relates storage segments to the different parts of a stored digital video and/or audio stream. The pointers or indexes then indicate the limits of the segments, e.g. the pointers refer to a memory address or to a file.

As a further enhancement, in order to relate records and segments to users, the method comprises, per segment, the storing of information relating a segment to a user at the origin of a received trigger event or request, which is advantageous for managing storage space on a per-user basis.

Alternatively, the segments themselves comprise all information that allows them to be related to a time slot and optionally to users, for example in the form of a header or descriptor.

Figure 4:
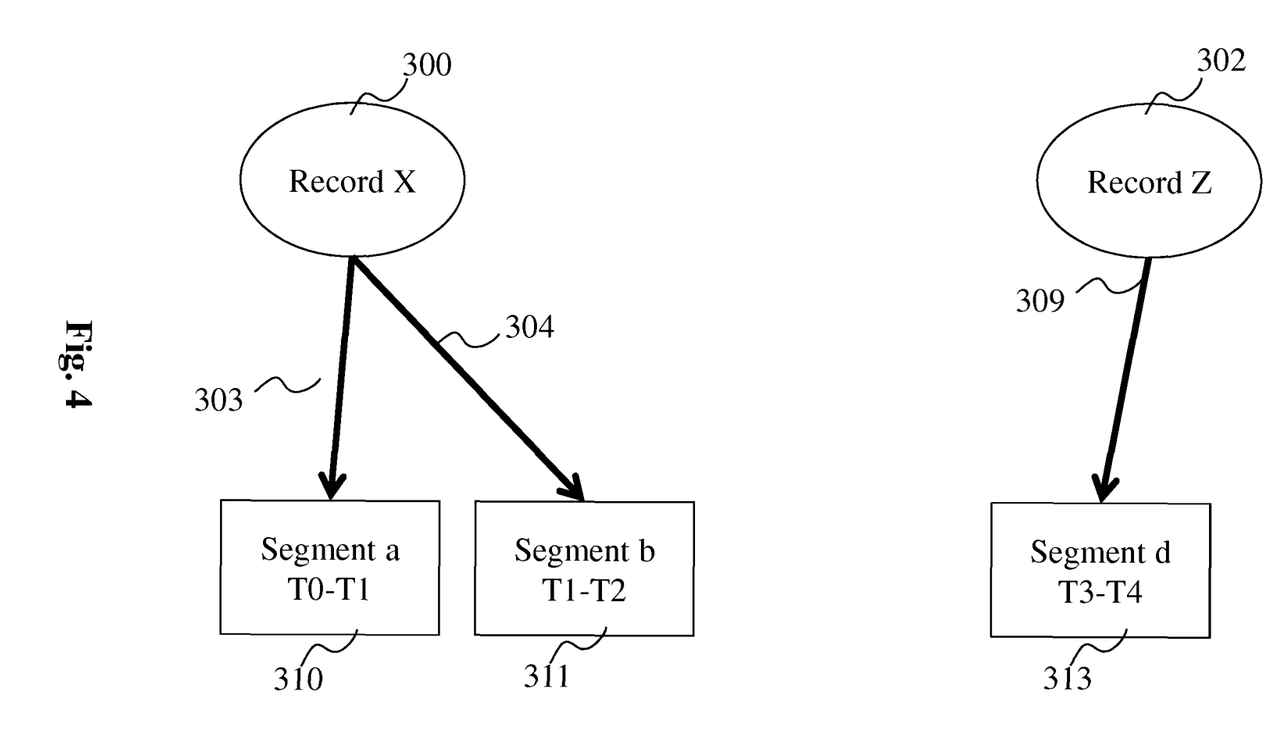
FIG. 4 illustrates a usage scenario that is consecutive to that illustrated in FIG. 3.

FIG. 4 illustrates a usage scenario that is consecutive to that of FIG. 3 and in which a record is deleted.

Now if user "y" deletes record "Y", the situation as illustrated in FIG. 4 is obtained, where Record "Y" has been deleted, resulting in deletion of segments "c" 312 and "e" 314.

FIG. 5 is a block diagram of a device for storing of a plurality of overlapping recordings of a same digital video and/or audio stream according to a particular non-limiting embodiment.

The device comprises a CPU or Central Processing Unit or processor 510, a clock unit 511, a network interface 512, an I/O interface 513, a non volatile memory 515, and a volatile memory 516. All these elements are interconnected by a data or communication bus 514. The device can be connected to a communication network via connection 1000, and to external input/output devices (e.g. keyboard, screen, external data storage, satellite or cable RF input (RF=Radio Frequency)) via connection 1001. CPU 510 is capable of executing computer-readable instructions such as instructions that implement the claimed method of the invention. Non volatile memory 515 stores a copy of the computer readable instructions in a memory zone 5151. Non volatile memory 515 further stores persistent data in a memory zone 5152, such as variables and parameters that need to be saved in a persistent way, to be used to put the device in a known state when it restarts from a power outage. Volatile memory 516 comprises a memory zone 5161, which comprises a copy of the computer readable instructions stored in memory zone 5151 of non volatile memory 515, which instructions are copied into memory zone 5161 upon startup of the device. Volatile memory 516 further comprises a memory zone 5162, used for temporary, non persistent data storage, for example for variables that are used during the execution of the computer readable instructions stored in memory zone 5161, or for storage of segments and segment lists. Alternatively, the segments/segment lists of are stored on an external memory device that is connected to I/O 513, or are stored on a network device that is connected to network interface 512. The network interface 512 and connection 1000 or alternatively I/O interface 513 and connection 1001 are used for receiving a digital video and/or audio stream. Clock unit 511 provides a clock signal that is used by the different elements 510 and 512 to 516 for timing and synchronization.

The device 500 is a non-limiting example of a device for storing of a digital video and/or audio stream, received for example via network interface 512 or I/O interface 513, and comprises storage means such as VM RAM 516 for storing of non-overlapping parts of the digital video and/or audio stream in storage space, and means (e.g. CPU 510) for splitting the storage space into storage segments according to a reception of trigger events.

Figure 6:
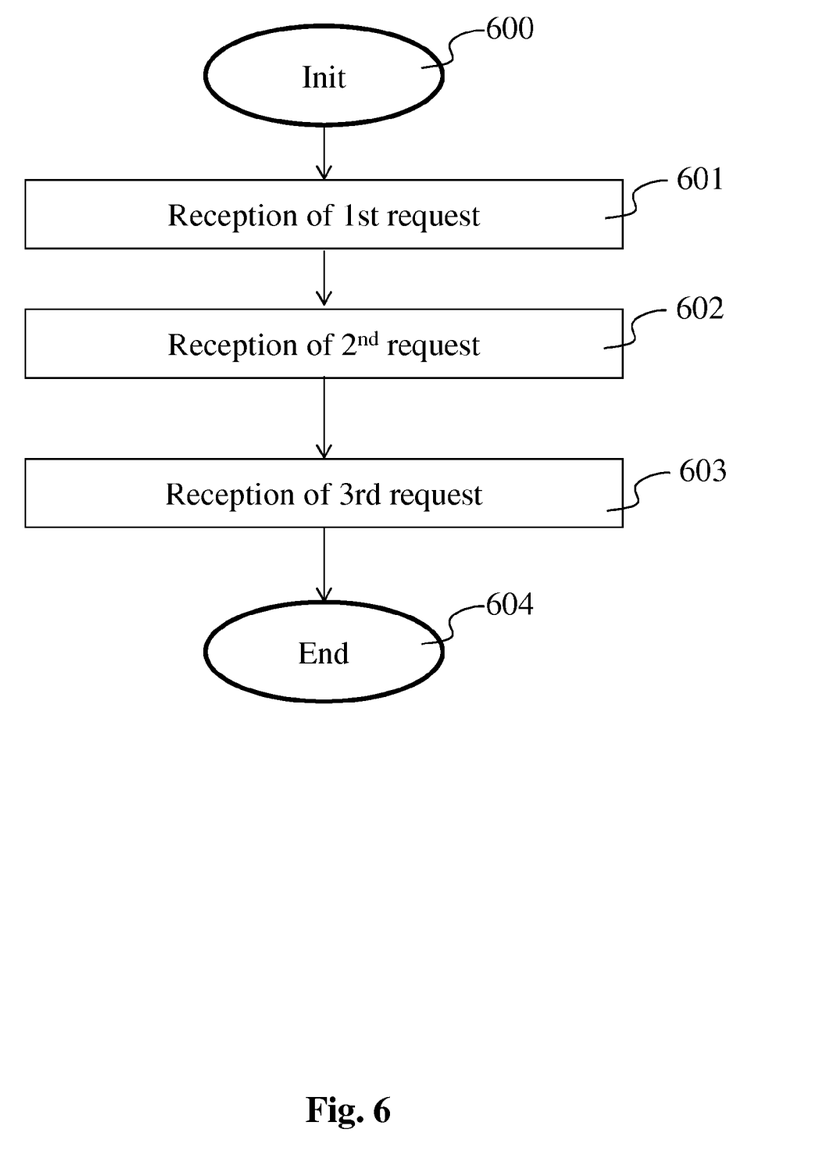
FIG. 6 is a logical diagram of the method of the invention according to a non-limiting example embodiment.

FIG. 6 is a logical diagram of the method of storing a plurality of overlapping recordings of a same digital video and/or audio stream according to a non-limiting example embodiment.

In a first step 600, variables and parameters are initialized that are used for the method. In a step 601, a first request (e.g. 111) is received for recording of a digital video and/or audio stream (e.g. 104). This results in the opening of a segment (200), referred to as current segment, and recording of said digital video and/or audio stream in the current segment. In a step 602, a second request (e.g. 112, 114) is received for recording the digital video and/or audio stream. This results in closing of the current segment (200, 202) and opening of a new current segment (201; 203) and continuing recording of the digital video and/or audio stream in the current segment. In a step 603, a third request (e.g. 115) is received for stopping the recording of the digital video and/or audio stream. This results in closing of the current segment, and if there is at least one recording ongoing, opening of a new current segment and continuing recording of the digital video and/or audio stream in the current segment. The method ends with a step 604.

The current invention allows efficient management of resources such as storage space, front-end, demultiplexer, tuner, and descrambler. Through the use of segments and the trigger-event driven splitting of these, the invention improves record edition and record deletion. The segments divide the storage space in relatively small units that increase the probability that a segment can be deleted (or reused) if no longer needed, whereas the trigger-event driven splitting of segments further increases the possibility that a segment can be deleted (or reused) as the segment limits are determined by the trigger events. This is true for user-generated events (e.g. start, stop recording (including pre-programmed start/stop recording), time shift) but also true for signalization-generated events (e.g. start/end of a video and/or audio program) and time-based trigger events (e.g. periodically generated events when a storing is ongoing). The latter is notably useful for reducing the size of the segments when these are used to store a buffer for time shift. Time shift buffers have the particularity that they are limited in duration (for example, 1 hour of recording) or are limited in size (for example 2 Gbyte), and when this limit is reached, the buffer must be truncated (i.e., as no more data can be added, a part of the buffer must be deleted to free memory to continue storing data for the time shift). The term 'time shift truncation' is then used, that relates to the management of time shift buffers. In the present invention, as data is stored in segments, the segments are kept small compared to the maximum time shift buffer duration or size and segments can be freed, without needing to free a whole time shift buffer. The additional time-based trigger events can be advantageous for a finer time shift truncation, by further increasing the probability that a segment can be freed if it is no longer used.

In the preceding, the "trigger events" were described as being user initiated actions (e.g. press on the "rec", "pause", "play" key of a remote control) or actions initiated by a change in broadcast signal (e.g. start and end of a digital video and/or audio program transmission). Trigger events can however also be based on signalization information such as EPG (Electronic Program Guide) "current" and "following" signalization events such as for example available in a digital video and/or audio stream that is a succession of video and/or audio programs and that comprises for example Digital Video Broadcasting-Service Information (DVB-SI) or that comprises for example Advanced Television Systems Committee-Service Information (ATSC-SI), the service information comprising information on the duration of video and/or audio programs in a digital video and/or audio stream), signalization related to the start and end of commercials or advertisements. This is for example particularly advantageous if the user stores a digital video and/or audio stream (either manually by pressing on a record button of a remote control, or automatically through a preprogrammed recording). The trigger events, originating from signalization information or other, result in splitting the required storage space in segments, and it can be proposed to the owner of the recording to delete some segments (for example those comprising advertisements) in order to gain storage space.

Alternatively, and non-exclusively, trigger events can also be time-based. A periodic, time-based generation and reception of a trigger event that causes segment splitting is for example useful to allow later "editing" of a recording, for example to ease the deletion and insertion segments for a fine-grained and optimized use of storage resources.

In the preceding, the wording "storing" is used. In the context of the current invention, non limited examples of storing are recording, time-shifting e.g. for streaming-out (e.g. a master Set Top Box implementing a time shift function for a slave Set Top Box that has no time shift buffer itself), i.e. for any reason that requires storing a digital video and/or audio stream on internal or external storage resource such as memory or disc.

In the preceding, the wording "segment" is used, meaning, a part of memory in a memory such as the volatile memory 516 of device 500 of FIG. 5, or a file (e.g. stored in a memory or on a disc). When a segment is implemented as a file, the splitting of segments can be implemented as a creation of a new file (Linux "create-file" for example) and closing of a previous (e.g. "fclose") one if any, and may comprise additional actions such as opening (e.g. "fopen") and closing (file close of the previous file). Likewise, the stopping of storing (for example due to a trigger event caused by a press on the "stop" record button of a remote control) then may require the closing ("fclose") of the "current" file, without opening a new file. When the segments are implemented as memory segments, the closing and the opening of segments are represented by placement of indexes that indicate segment end and start, for example in a master record, or directly in the memory storing the memory segments.

The current invention can be advantageously applied in many kinds of devices such as a home gateway, a Set Top Box, a HDTV, a smartphone, and in many kinds of contexts, such as: within a single device; in a configuration where one server ("master") serves multiple (N) clients (or "slave") devices in a local (e.g. home) network. In such a configuration, the master implements the method of storing according to the invention, the slave devices merely renders video and/or audio and generates the trigger events; or one server and N clients in a cloud network.

In the preceding, the term "digital video and/or audio" is used, meaning a digital video stream only, a digital video stream with audio, or an audio stream only. The current invention is however not limited to streams that comprise only digital video and audio; additional data that may be stored with the digital video and/or audio are for example: subtitles, signalization tables and applications.

The source of the digital video and/or audio stream can be Broadcast (terrestrial, Cable, Satellite), Broadband (IP/UDP, HTTP, HTTP smooth streaming, HLS (HTTP Live Streaming) or any other transport means that carries digital video and/or audio streams.

The implementation of the invention is not limited to the embodiments shown. The reader will understand that FIG. 5 is a non-limiting example embodiment of the present invention. Notably, a device implementing the invention can comprise more or less elements than depicted, such as for example less elements that implement multiple functions, or more elements that implement more elementary functions.

Likewise, the reader will understand that the implementation of the method or the invention is not restricted to an implementation as depicted in FIG. 6, and that the steps of the methods can be executed in a different order, or in parallel, for example to gain processing time.

The discussed variants can be used apart, or combined between them to provide a particularly advantageous variant embodiment of the invention.

Although some of the described embodiments discuss a use of hardware elements, some functions that are presented as being implemented by hardware may instead be implemented in software to reduce production costs of a device implementing the present invention.

Alternatively, the invention is implemented using a mix of hard- and software components, where dedicated hardware components provide functions that are alternatively executed in software. According to a particular embodiment, the invention is entirely implemented in hardware, for example as a dedicated component (for example as an ASIC, FPGA or VLSI) (respectively <<Application Specific Integrated Circuit>>, <<Field-Programmable Gate Array>> and <<Very Large Scale Integration>>) or as distinct electronic components integrated in a device or in a form of a mix of hardware and software.

The invention claimed is:

1. A method for storing a plurality of overlapping recordings of a same digital video and/or audio stream in a memory, wherein said method comprises storing said plurality of overlapping recordings of said same digital video and/or audio stream as a single segmented recording, where said single segmented recording comprises a plurality of non-overlapping segments, each of the non-overlapping segments including a respective part of said digital video and/or audio stream, said method comprising:
    receiving a first request for a first recording of said same digital video and/or audio stream, creating a first recording segment and recording of said same digital video and/or audio stream in said first recording segment for storage in the memory;
    during said first recording, receiving a second request for a second recording of said same digital video and/or audio stream, upon receipt of said second request, closing the first recording segment and creating of a second recording segment and continuing recording said same digital video and/or audio stream in said second recording segment for storage in the memory; and
    receiving a third request for stopping said second recording of said same digital video and/or audio stream, upon receipt of said third request, closing the second recording segment, creating a third recording segment and continuing recording of said same digital video and/or audio stream in said third recording segment for storage in the memory;
    said first recording including said first, second, and third segments, and said second recording including said second segment, and said second request for recording is a request for time shifting a visualization of said digital video and/or audio stream, and said third request for stopping of said second recording is a request for resuming said visualization.

2. The method according to claim 1, wherein said each segment is a file, and said creating is a file opening operation.

3. The method according to claim 1, wherein said each segment is a memory segment, and said creating is a placement of an index at an end of said each segment in a memory storing a memory segment.

4. The method according to claim 1, wherein said method comprises, per said each segment, a storing of a time stamp related to said same digital video and/or audio stream.

5. The method according to claim 1, wherein said method comprises, per said each segment, a storing of information relating said each segment to a user at an origin of a request for recording.

6. A device for storing a plurality of overlapping recordings of a same digital video and/or audio stream, characterized in that said device comprises:
    a memory configured to store said plurality of overlapping recordings of said same digital video and/or audio stream as a single segmented recording, wherein said single segmented recording comprises a plurality of non-overlapping segments, each of the non-overlapping segments including a respective part of said digital video and/or audio stream;
a network interface configured to receive a first request for a first recording of said same digital video and/or audio stream, a central processing unit configured to create a first recording segment and said memory being further configured to store said same digital video and/or audio stream in said first recording segment;
said network interface being further configured to receive a second request for a second recording of said same digital video and/or said audio stream, upon receipt of said second request, said central processing unit being further configured to close the first recording segment and create a second recording segment and to continue recording said same digital video and/or audio stream in said second recording segment and said memory being further configured to store said second recording segment; and
said network interface being further configured to receive a third request for stopping said second recording of said same digital video and/or audio stream, upon receipt of said third request, said central processing unit being further configured to close the second recording segment, create a third recording segment and continue recording of said same digital video and/or audio stream in said third recording segment and said memory being further configured to store said third recording segment;

said second request for recording is a request for time shifting a visualization of said digital video and/or audio stream, and said third request for stopping of said second recording is a request for resuming said visualization.

7. The device according to claim 6, wherein said central processing unit is further configured to store said each segment as a file.

8. The device according to claim 6, wherein said central processing unit is further configured to place an index in said memory when creating said each segment.

9. The device according to of claim 6, wherein said central processing unit is further configured to store, per said each segment, a time stamp related to said same digital video and/or audio stream.

10. The device according to claim 6, wherein said central processing unit is further configured to store, per said each segment, information relating a segment to a user at an origin of a request for recording.

11. The device according to claim 6, wherein the device is a home gateway.

12. The device according to claim 6, wherein the device is a Set Top Box.

13. The device according to claim 6, wherein the device is a high definition television.

14. The device according to claim 6, wherein the device is a smartphone.

* * * * *

UNITED STATES PATENT AND TRADEMARK OFFICE
CERTIFICATE OF CORRECTION

| | |
|---|---|
| PATENT NO. | : 9,924,219 B2 |
| APPLICATION NO. | : 14/651219 |
| DATED | : March 20, 2018 |
| INVENTOR(S) | : Bruno Le Garjan, Franck Adam and Mark A. McCleary |

It is certified that error appears in the above-identified patent and that said Letters Patent is hereby corrected as shown below:

In the Specification

At Column 1, Line 7, replace "PCT/ EP2013/075419," with --PCT/EP2013/075419,--

At Column 1, Line 9, replace "2014under" with --2014 under--

In the Claims

At Column 14, Line 12, Claim 9, replace "to of" with --to--

Signed and Sealed this
Ninth Day of January, 2024

Katherine Kelly Vidal
*Director of the United States Patent and Trademark Office*